(12) United States Patent
Bryan, IV

(10) Patent No.: US 7,565,990 B2
(45) Date of Patent: Jul. 28, 2009

(54) COMBINATION BICYCLE RACK AND WORKOUT STATION

(76) Inventor: Frederick E. Bryan, IV, 821 Floral Ave., Terrace Park, OH (US) 45174

( * ) Notice: Subject to any disclaimer, the term of this patent is extended or adjusted under 35 U.S.C. 154(b) by 327 days.

(21) Appl. No.: 11/565,694

(22) Filed: Dec. 1, 2006

(65) Prior Publication Data
US 2008/0128463 A1    Jun. 5, 2008

(51) Int. Cl.
B60R 9/00    (2006.01)
B60R 7/00    (2006.01)

(52) U.S. Cl. .................. 224/519; 224/521; 224/525; 224/531; 224/282; 482/133

(58) Field of Classification Search .............. 224/519, 224/521, 525, 531, 282; 482/133, 138, 142
See application file for complete search history.

(56) References Cited

U.S. PATENT DOCUMENTS

| | | | |
|---|---|---|---|
| 4,400,129 A * | 8/1983 | Eisenberg et al. .......... 414/462 |
| 5,330,084 A * | 7/1994 | Peters .......................... 224/506 |
| 5,690,260 A | 11/1997 | Aikins et al. |
| 5,775,560 A | 7/1998 | Zahn et al. |
| 6,206,259 B1 * | 3/2001 | Brungardt et al. ........... 224/497 |
| 6,237,824 B1 * | 5/2001 | Bagley ........................ 224/521 |
| 6,348,028 B1 * | 2/2002 | Cragg ......................... 482/148 |
| 6,631,938 B1 | 10/2003 | Burns |
| 6,705,821 B2 * | 3/2004 | Philipps et al. .............. 414/462 |
| 6,921,007 B1 * | 7/2005 | Guerrant ..................... 224/519 |
| 2004/0164112 A1 * | 8/2004 | McClain et al. ............. 224/401 |
| 2006/0186638 A1 * | 8/2006 | Varner ........................ 280/506 |

* cited by examiner

Primary Examiner—Nathan J Newhouse
Assistant Examiner—Lester L Vanterpool
(74) Attorney, Agent, or Firm—Clausen Miller PC

(57) ABSTRACT

A trailer hitch mounted combination bike rack and workout station is provided. The device can be used to store and carry up to three bicycles, and can also be used as a workout station for pull ups, dips, sit ups and other exercises.

2 Claims, 7 Drawing Sheets

COMBINATION BICYCLE RACK AND WORKOUT STATION

BACKGROUND

1. Field of the Invention

This patent relates to a combination bike rack and exercise workout station. More particularly, this patent relates to a combination bicycle rack and exercise workout station that can be attached to a vehicle's trailer hitch.

2. Description of the Related Art

A number of United States patents disclose trailer hitch mounted bike racks. For example, Carlson U.S. Pat. No. 5,469,997 discloses a trailer hitch mounted bicycle rack that can lock up to six bicycles. Despain U.S. Pat. No. 5,526,971 discloses a trailer hitch mounted bike rack comprising a transverse parallel trays for supporting the rear bike wheels and an upright with a fork mount for supporting the bicycle fork after the front wheel is removed and secured by a separate yoke. Aikins U.S. Pat. No. 5,690,260 discloses a bicycle carrier having two outwardly projecting parallel bars that can be used to carry one or more bicycles. Zahn et al. U.S. Pat. No. 5,775,560 also discloses a hitch mounted bike rack comprising two outwardly projecting parallel bars that can be used to carry one or more bicycles. The Zahn bike rack can be pivoted downward to allow access to the vehicle. Finally, McLemore U.S. Pat. No. 6,752,303 discloses a trailer hitch mounted bike carrier device comprising two tracks for supporting one or two bicycles in a transverse (sideways to the vehicle) orientation.

Varner U.S. Published Patent Application No. 2006/0186638 discloses, in FIG. 1B, a trailer hitch mounted stationary bike. However, Varner does not teach that the exercise apparatus can be used as a bike rack.

To the knowledge of the inventor, no reference teaches a trailer hitch mounted device that can be used both as a bike rack and as an exercise apparatus. Yet such a device would be highly desirable to bicyclists and other persons who want not only a portable bike carrier but also a portable exercise device for doing pull ups, sit ups, dips and the like.

Thus it is an object of the present invention to provide a trailer hitch mounted combination bicycle carrier and exercise apparatus.

A further object of the invention is to provide a trailer hitch mounted bicycle carrier that can also be used for pull ups, sit ups, dips and other exercises.

Further and additional objects will appear from the description, accompanying drawings, and appended claims.

SUMMARY OF THE INVENTION

The present invention is a combination bicycle rack and workout station. The invention comprises an L-shaped support frame attachable to the trailer hitch of a vehicle, a vertical support bar that telescopes upward from within the support frame and terminates in a horizontal bar that can be used for pull ups; and two parallel bars extending horizontally rearward from the L-shaped support frame that can be used either as a bicycle rack or as exercise bars. The combination bicycle rack and workout station may further comprise a sit up board connected to the L-shaped support frame, either on the side toward the vehicle or on the side away from the vehicle.

The L-shaped support frame comprises a vertical member, a horizontal member and a hinge member. The vertical member is pivotally attached to the horizontal member by the hinge member and extends upward therefrom. A cotter pin secures the vertical member to the hinge member and can be removed so that the vertical member can be rotated about ninety degrees downward until it is horizontal (parallel to the ground). In this position the parallel bars contact the ground and help support the vertical member.

THE DRAWINGS

DETAILED DESCRIPTION OF THE INVENTION

Figure 1:
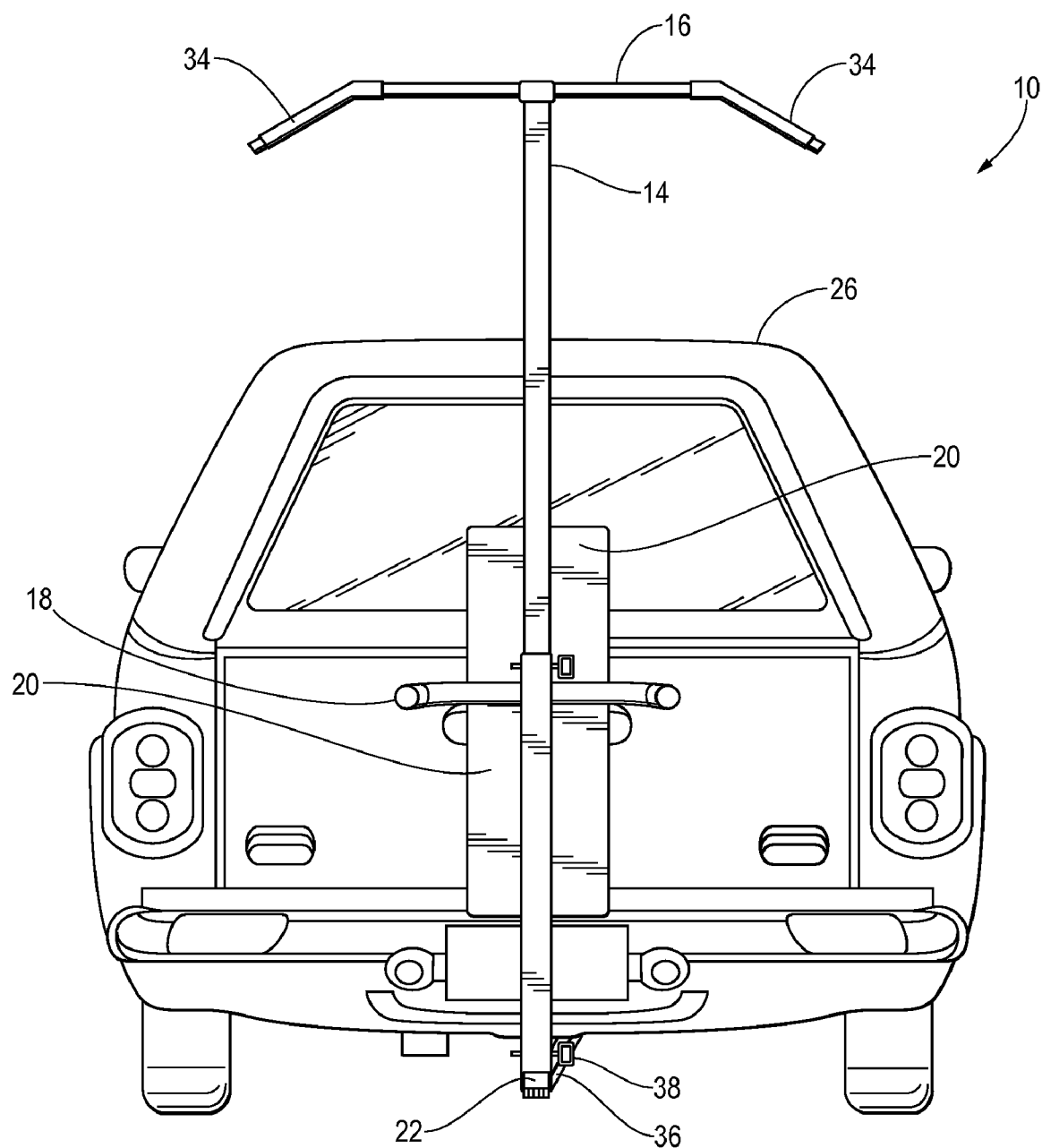
FIG. 1 is a rear perspective view of a combination bicycle rack and exercise workout station according to the present invention.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

Turning to the drawings, there is shown in FIG. 1 one embodiment of the present invention, a combination bike rack and workout station 10 mountable to the rear of a vehicle using a standard 2 inch trailer hitch 36. The device 10 comprises a multi-piece L-shaped support frame 12, a telescoping vertical support bar 14 that telescopes upward from the L-shaped support frame 12 and terminates in a pull up bar 16, two parallel bars 18 extending outward from the L-shaped support frame 12, and a sit up board 20 connected to the L-shaped support frame 12.

Figure 2:
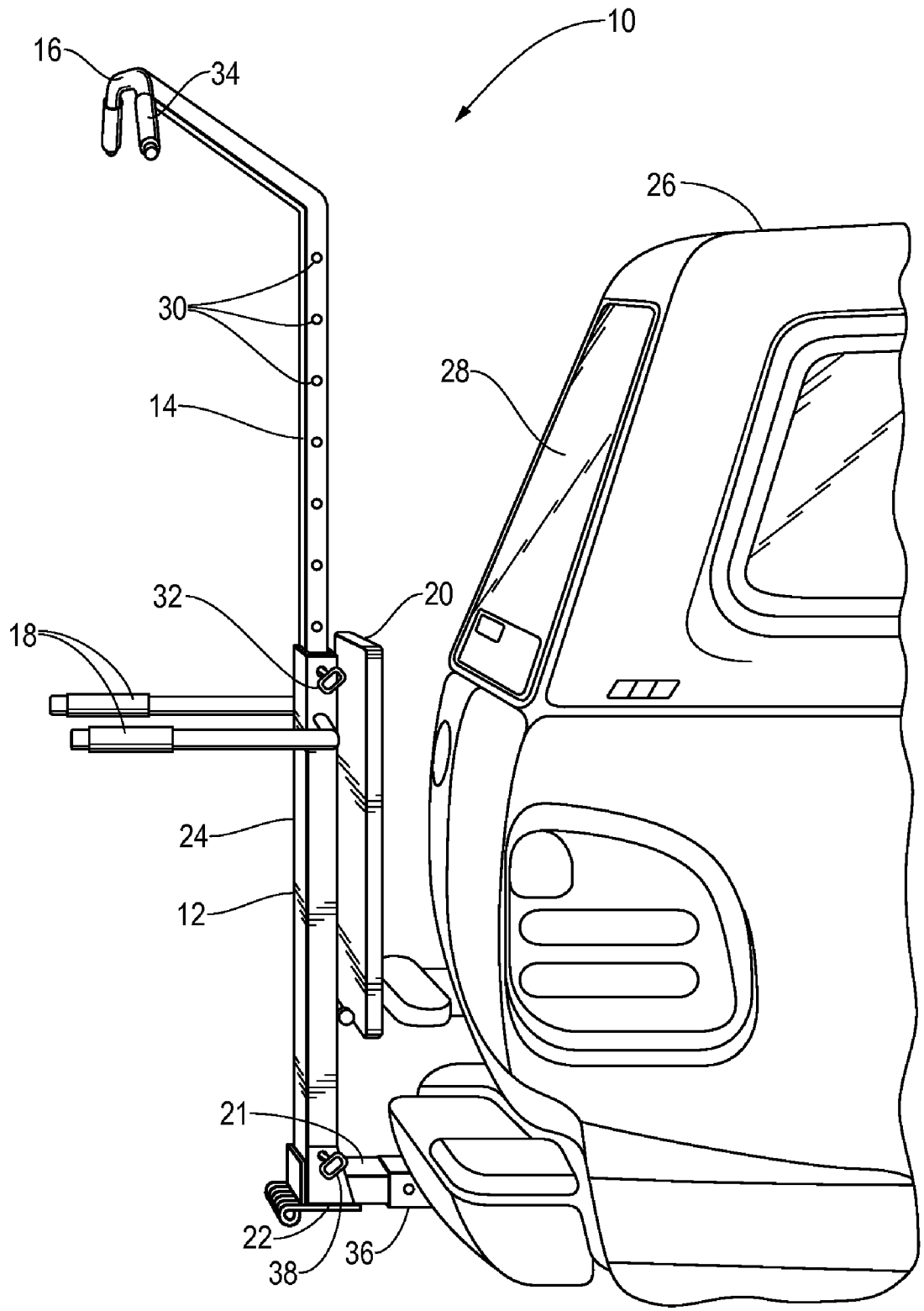
FIG. 2 is a side perspective view of the combination bicycle rack and exercise workout station of FIG. 1.
Figure 5:
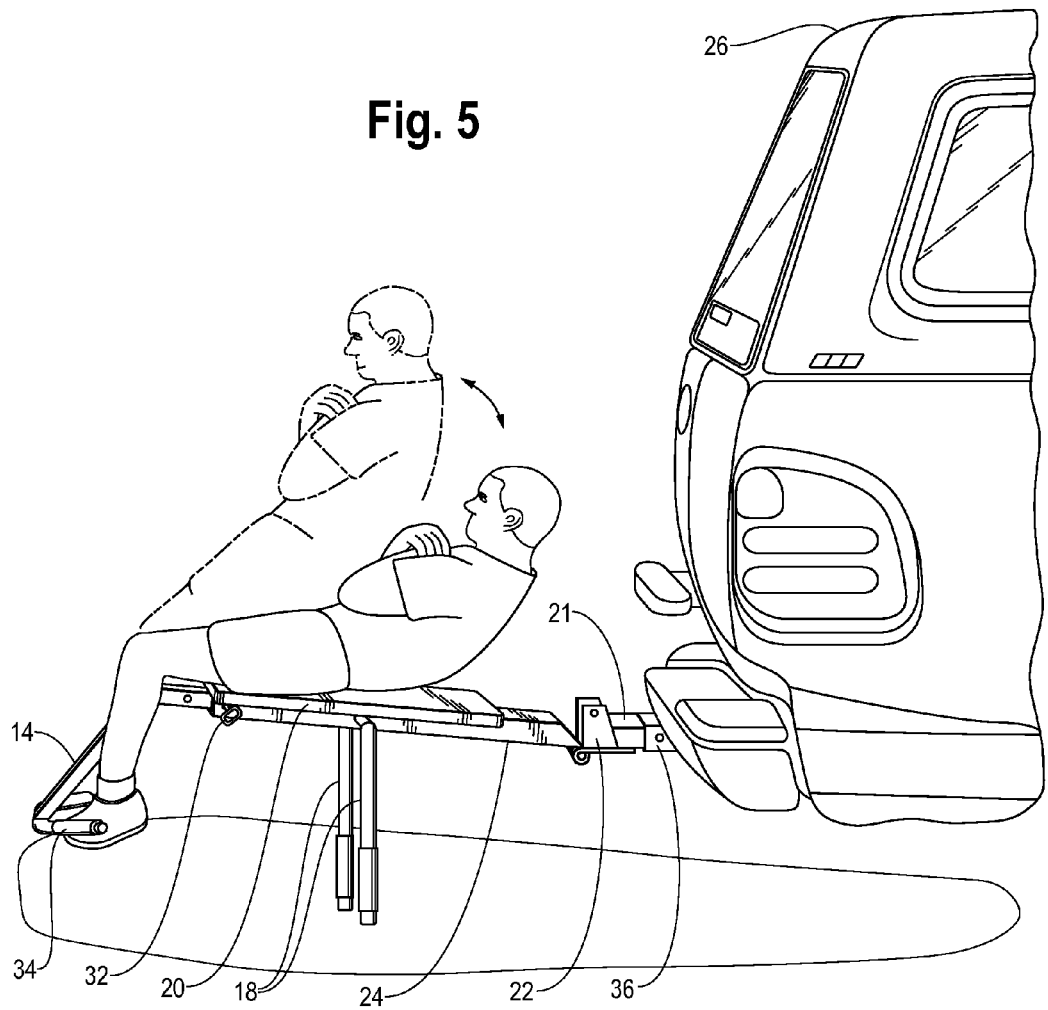
FIG. 5 is a side perspective view of the combination bicycle rack and exercise workout station of FIG. 1 shown being used for sit ups.

Referring to FIG. 2, the L-shaped support frame 12 comprises a horizontal member 21, a hinge member 22 and a vertical member 24. The horizontal member 21 is mountable to a vehicle 26 having a standard trailer hitch 36. The vertical member 24 is pivotally connected to the horizontal member 21 by a hinge member 22 and extends upward therefrom. As shown in FIG. 5, a cotter pin 38 can be removed from aligned holes in the vertical member 24 and hinge member 22 so that the vertical member 24 can be rotated about ninety degrees with respect to the hinge member 22 until the vertical member 24 is about horizontal (parallel to the ground). In this position the parallel bars 18 contact the ground and support the vertical member 24. The hinge member 22 may include a spring element that biases the vertical member 24 in the upright, vertical position where it can be locked into place by inserting the cotter pin 38 through aligned holes in the hinge member 22 and vertical member 24.

The telescoping vertical support bar 14 is telescopically attached to and slides within the vertical member 24 and may be angled outward (away from the vehicle 26) near its top to allow extra clearance from the vehicle 26. A pull up bar 16 is attached to the distal (top) end of the telescoping vertical support bar 14 and can be used to perform pull ups or other exercises that require a bar elevated off the ground. Preferably the telescoping vertical support bar 14 is located far enough away from the vehicle 26 to allow a rear hatch window 28 to be opened by lifting the window 28 upward if the vehicle 26 is so equipped. The telescoping vertical support bar 14 further comprises holes 30 that cooperate with a corresponding pair of holes near the top of the vertical member 24 so that the height of the telescoping vertical support bar 14 can be adjusted and set using a cotter pin 32.

Figure 6:
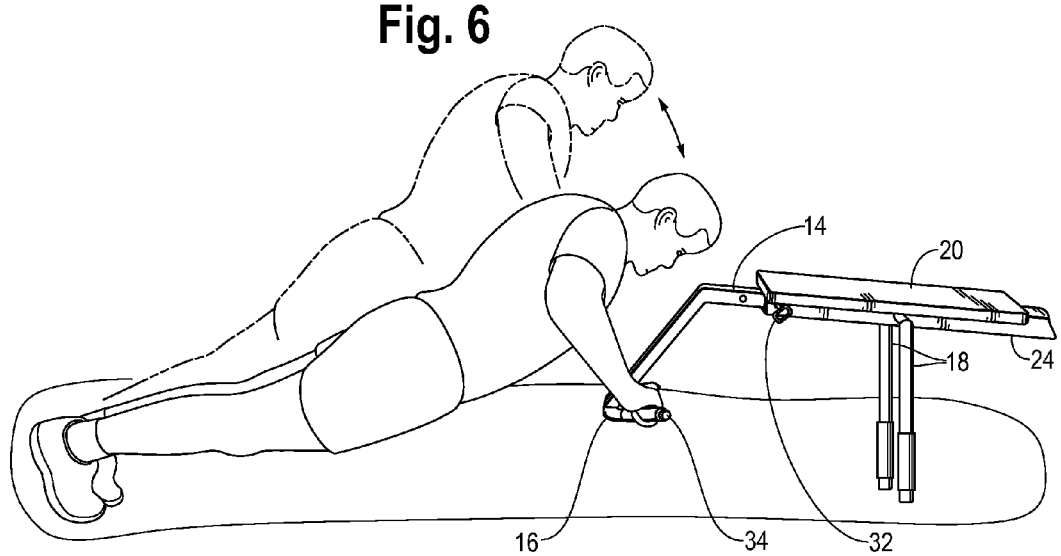
FIG. 6 is a side perspective view of the combination bicycle rack and exercise workout station of FIG. 1 shown being used for push ups.
Figure 7:
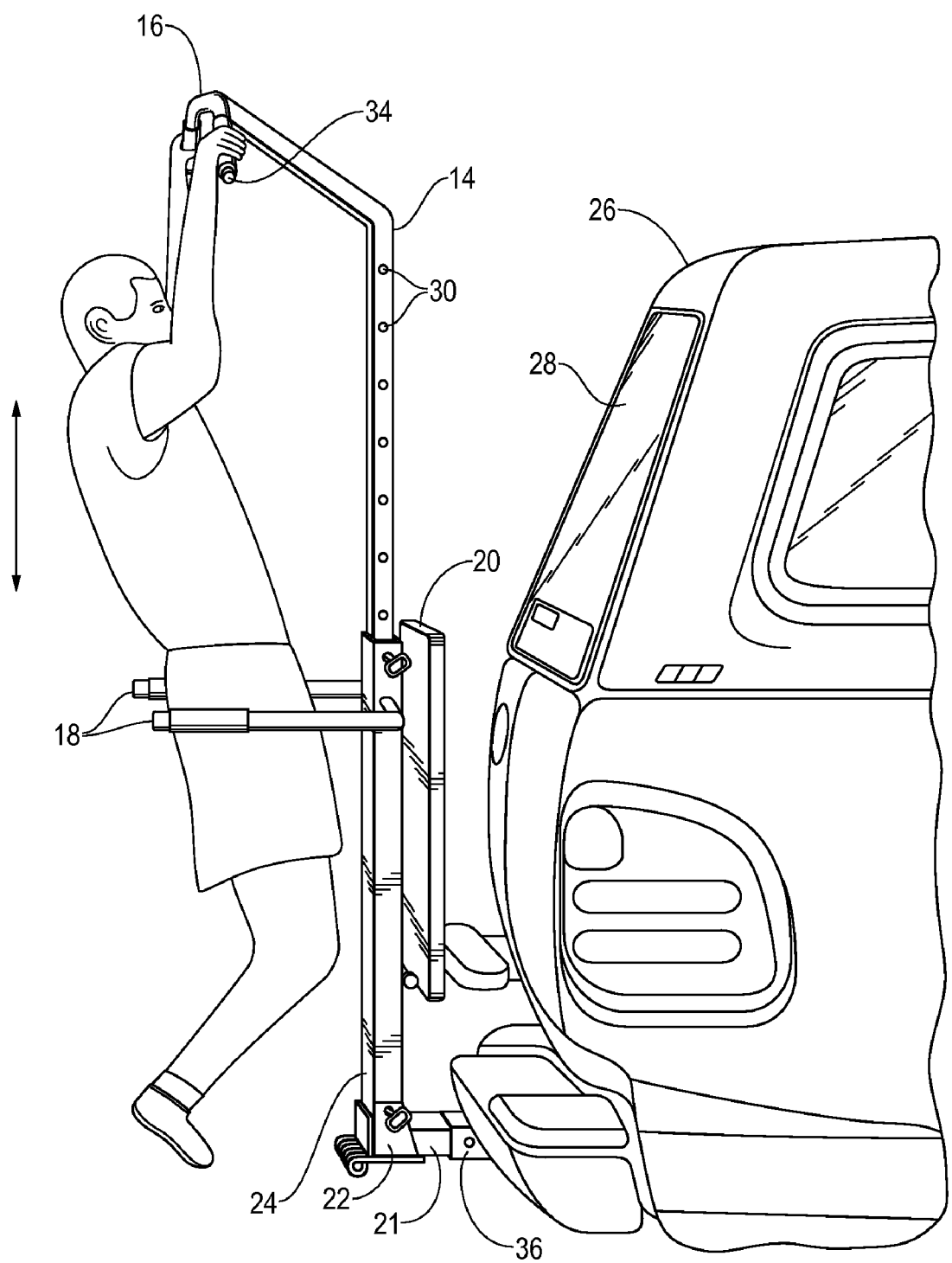
FIG. 7 is a side perspective view of the combination bicycle rack and exercise workout station of FIG. 1 shown being used for pull ups.

The pull up bar 16 is itself conventional in design and comprises gripping handles 34. The pull up bar 16 may be attached to the telescoping vertical support bar 14 in a manner, including one that allows the pull up bar 16 to be rotated with respect to the telescoping vertical support bar 14. The pull up bar 16 may be used for doing pull ups as shown in FIG. 7. When the vertical member 24 is rotated ninety degrees away from the vehicle 26 until the dip bars 18 touch the ground, the pull up bar 16 can also be used for push ups as shown in FIG. 6.

Figure 3:
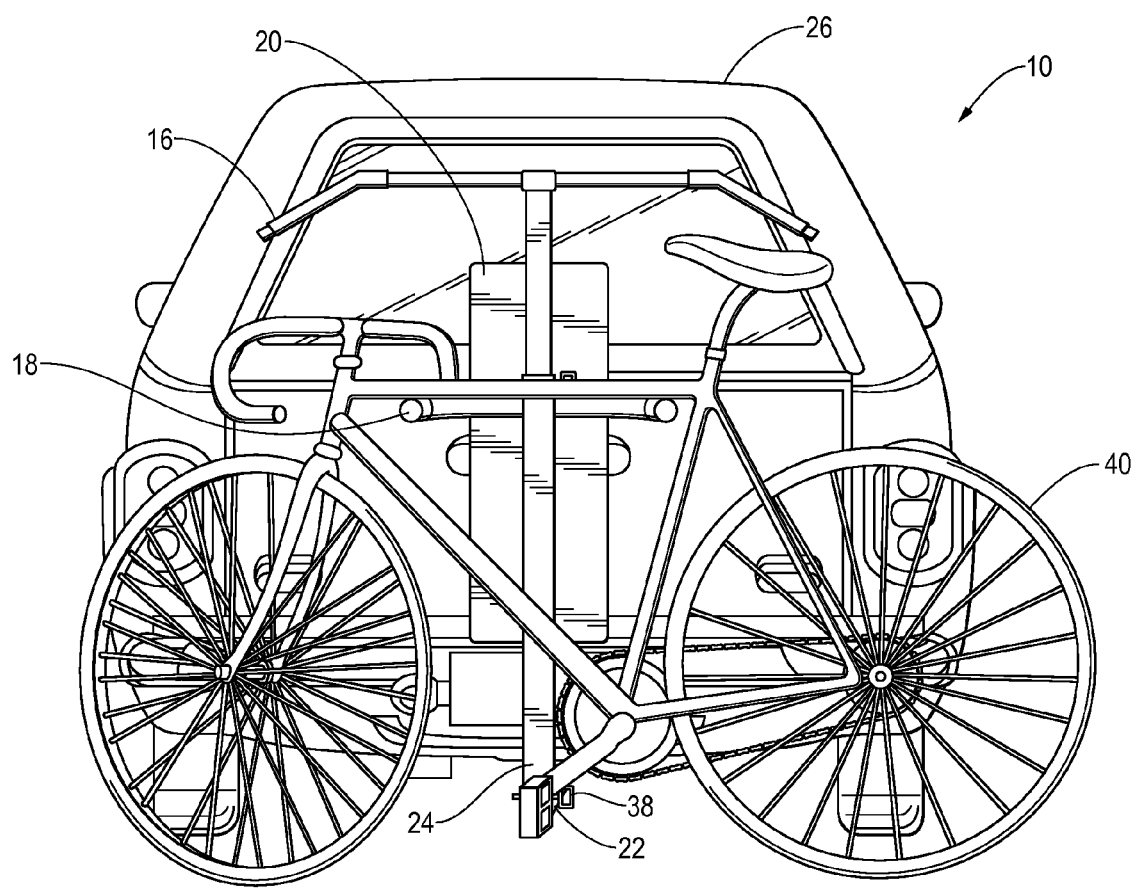
FIG. 3 is a rear perspective view of the combination bicycle rack and exercise workout station of FIG. 1 shown carrying a bicycle.
Figure 4:
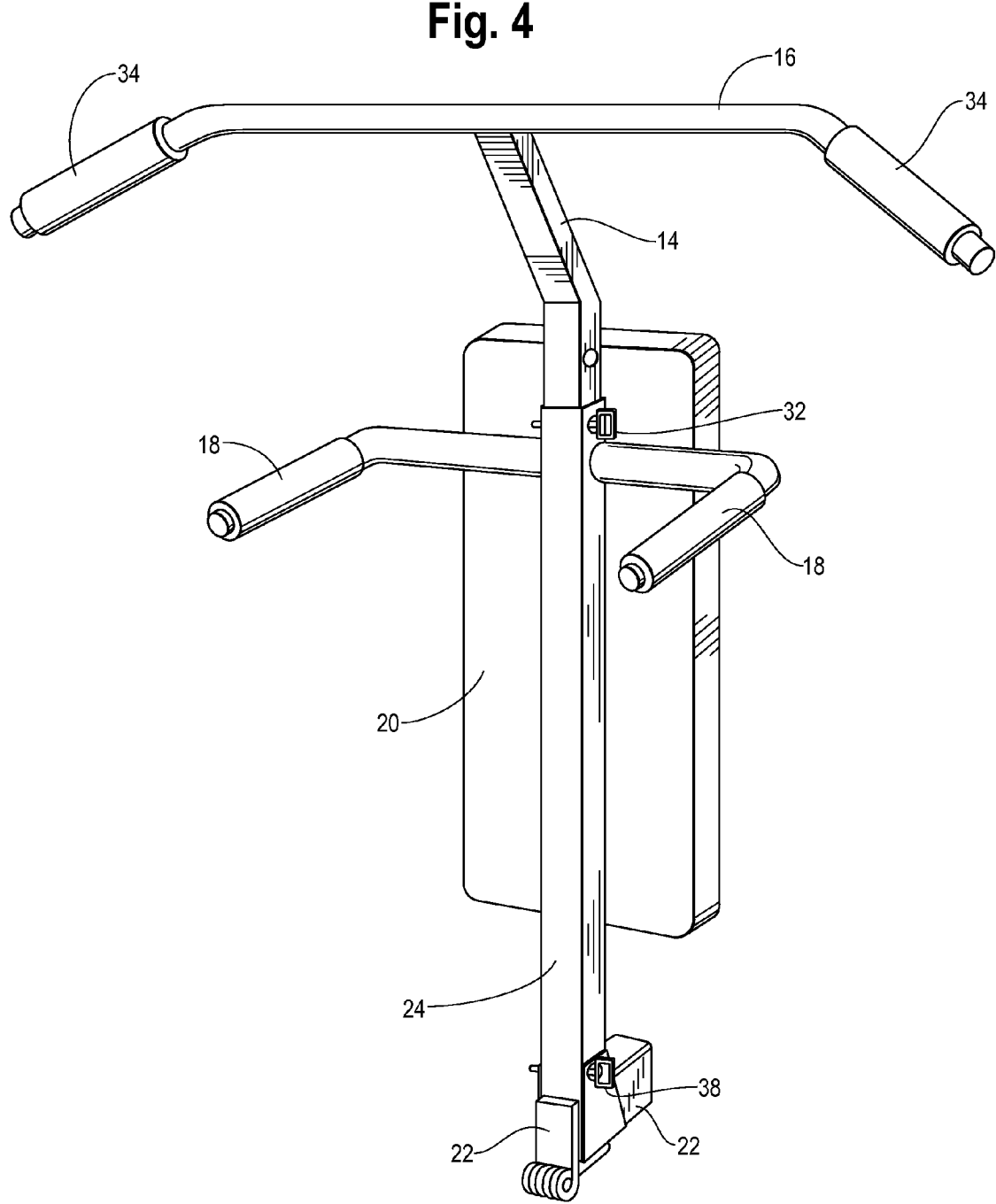
FIG. 4 is a three-quarter perspective view of the combination bicycle rack and exercise workout station of FIG. 1.
Figure 8:
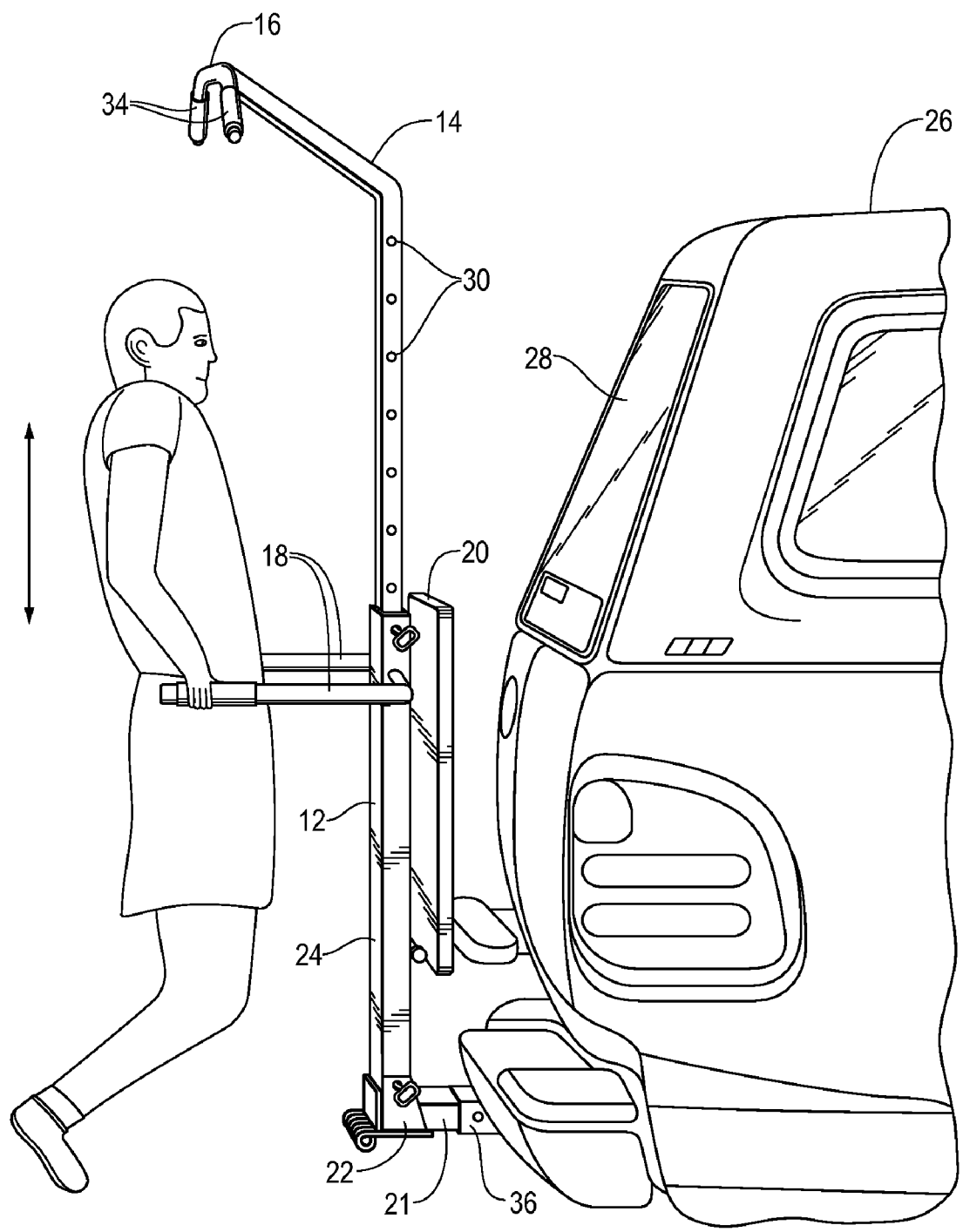
FIG. 8 is a side perspective view of the combination bicycle rack and exercise workout station of FIG. 1 shown being used for dips.

Referring to FIG. 4, the two parallel bars 18 are attached to and extend rearward from the vertical member 24, away from the vehicle 26. These bars 18 are used to support bicycles (FIG. 3) and can also be used as exercise bars for dips or other exercises (FIG. 8). Preferably the parallel bars 18 are rubber coated and long enough to accommodate two or three bicycles. As already noted, the vertical member 24 can pivot where it is attached to the hinge member 22 to allow easier access to the rear of the vehicle 26.

The optional sit up board 20 may be attached to the vertical member 24 in any suitable manner. In one anticipated embodiment the sit up board 20 is mounted by brackets in stationary fashion to the vertical member 24 on the side towards the vehicle 26. When the vertical member 24 is rotated ninety degrees downward the board 20 can be used as a sit up bench or as a shelf. When used for sit ups, the user can lay on the board 20 with his or her feet extending rearward and, if desired, hooked around the pull up bar handles 34 as shown in FIG. 5.

In another anticipated embodiment not shown in the figures the sit up board 20 is hingedly attached to the side of the vertical member 24 away from the vehicle 26 and can be raised or lowered as desired. For example, the board 20 can be lowered so that its distal end rests on the ground so it can be used for angled sit ups. When the vehicle 26 is to be moved the board 20 can be raised and secured to the vertical member 24 to prevent it from inadvertently lowering. In the lowered position the board 20 can also be used as a ramp to reach the pull up bar 16.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

I claim as my invention:

1. A combination bicycle rack and workout station mountable to a vehicle resting on a surface, the station comprising:
    an L-shaped support frame attachable to a vehicle and comprising a horizontal member and a vertical member pivotally connected to the horizontal member by a hinge member, wherein the vertical member can be pivoted between a vertical position and a substantially horizontal position;
    a telescoping vertical support bar that telescopes upward from within the vertical member, the telescoping vertical support bar comprising a vertical section and an angled section that is angled away from the vehicle and terminates in an upper end;
    a sit up board mounted to the vertical member of the L-shaped support frame on a side facing the vehicle, the sit up board being suitable for stably supporting the weight of a user performing sit ups when the vertical member is in the horizontal position;
    a horizontal pull up bar attached to the vertical support bar angled section at or near its upper end that can be used for pull ups; and
    two parallel bars extending horizontally from the L-shaped support frame in a direction away from the vehicle, wherein the parallel bars can be used either as a bicycle rack or as exercise bars;
    wherein, when the vertical member is in the horizontal position, the parallel bars extend vertically downward and contact the surface to help support the station and a user doing sit ups while on the sit up board.

2. The combination bicycle rack and workout station of claim 1 wherein the vertical member has a top end and wherein the vertical support bar has multiple sets of opposing holes that can be aligned with a pair of holes near the top end of the vertical member so that the height of the vertical support bar can be adjusted and set using a cotter pin.

* * * * *